United States Patent [19]
Niiler et al.

[11] Patent Number: 5,114,645
[45] Date of Patent: May 19, 1992

[54] FABRICATION OF CERAMICS BY SHOCK COMPACTION OF MATERIALS PREPARED BY COMBUSTION SYNTHESIS

[75] Inventors: Andrus Niiler, Bel Air, Md.; Gerald L. Moss, Newark, Del.; Robert J. Eichelberger, Bel Air, Md.

[73] Assignee: The United States of America as represented by the Secretary of the Army, Washington, D.C.

[21] Appl. No.: 296,999

[22] Filed: Dec. 6, 1988

[51] Int. Cl.$^5$ .............................................. C04B 33/32
[52] U.S. Cl. ........................................ 264/84; 264/80
[58] Field of Search ................................ 264/84, 80

[56] References Cited

U.S. PATENT DOCUMENTS 4,655,830  4/1987  Akashi et al. .......................... 264/84

*Primary Examiner*—James Derrington
*Attorney, Agent, or Firm*—Saul Elbaum; Muzio B. Roberto

[57] ABSTRACT

A method and apparatus for the production of high density, monolithic ceramic materials. A mixed powder such as Titanium-Carbon is first subjected to uniaxial pressure to form a green compact. The compact is positioned in a vented mould between two steel plates, reacted by a combustion synthesis process called SHS and then subjected to an explosively generated shockwave by an explosive charge positioned on the upper steel plate, which generates high pressures to compress the hot, porous ceramic to form high purity ceramic of more than 90% theoretical densities.

3 Claims, 1 Drawing Sheet

U.S. Patent May 19, 1992 5,114,645
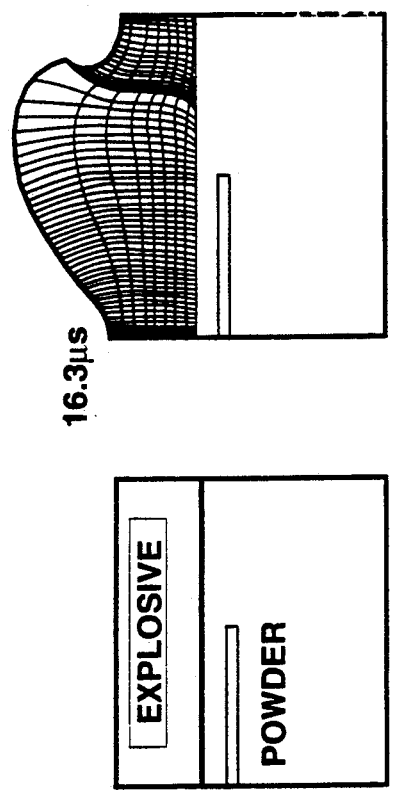
FIG. 2
FIG. 3
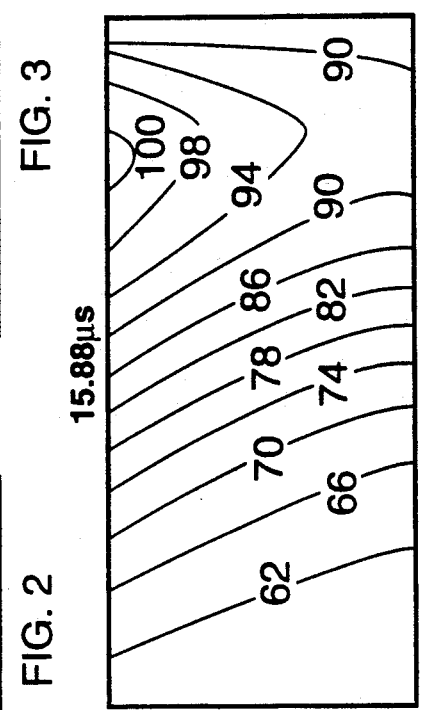
FIG. 4
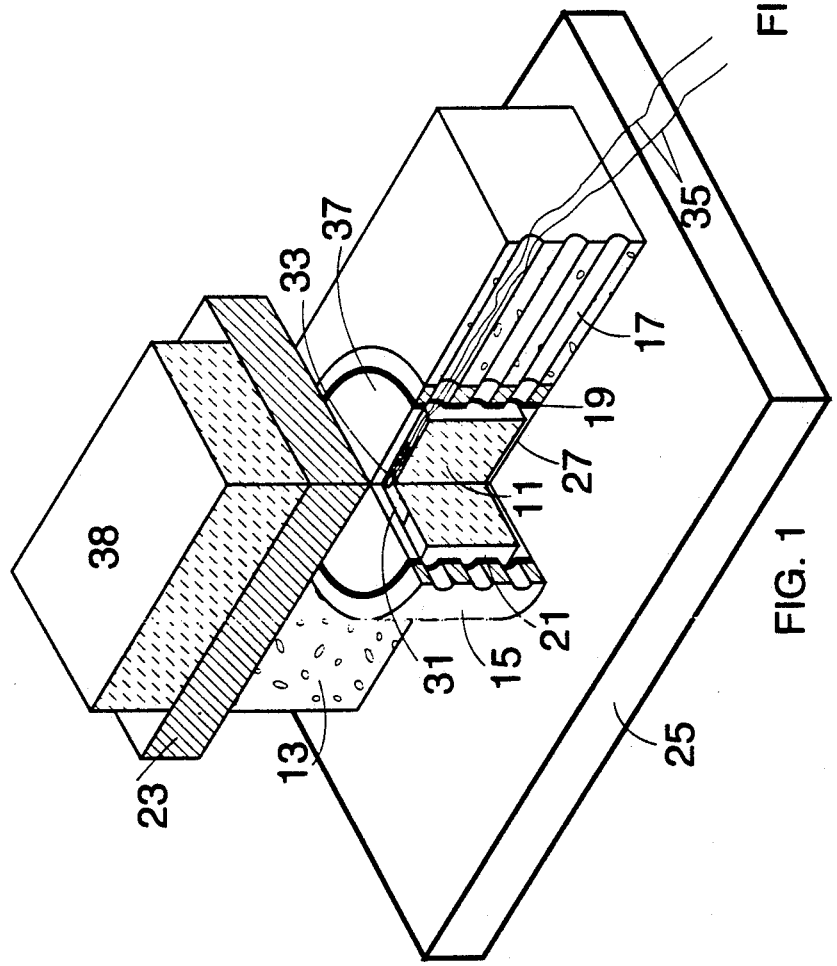
FIG. 1

FABRICATION OF CERAMICS BY SHOCK COMPACTION OF MATERIALS PREPARED BY COMBUSTION SYNTHESIS

RIGHTS OF THE GOVERNMENT

The invention described herein my be manufactured, used, and licensed by or for the Government for Governmental purposes without the payment to us of any royalties thereon.

BACKGROUND OF THE INVENTION

1. Technical Field

This invention relates to a method and apparatus for the production of density monolithic, ceramic material, comprising subjecting elemental powders to a combustion synthesis process in a novel system to produce a porous material, and compacting the ceramic to high density by pressure wave initiated by a high explosive.

2. Background Information

High-technology, structural ceramics are becoming utilized in ever larger range of applications which require light-weight, high-temperature, high-performance materials. These ceramics are typically the borides, carbides, nitrides and oxides of a variety of metals, and are fabricated in such a way as to eliminate most, if not all, porosity and impurities from the bulk. The production of these ceramics, however, involves complicated processes which, in general, use expensive starting materials, are very energy and labor intensive and so result in very high final product costs.

The most commonly used commercial process for fabricating these ceramics is hot pressing of the ceramic powder into the shape of a disc, rod or plate. Green (unfired) compacts of previously processed ceramic powders are placed into a die in a high temperature furnace and pressed with uniaxial pressure under inert gas atmosphere. While the sample is at high temperature, but well below the melting point of the ceramic, sintering (or solid welding) takes place during which the powder particles coalesce into a solid body. The length of time required for the whole body to be sintered may vary from a few to tens of hours. Since temperatures of 1200° C. to 1600° C. are quite common, these hot pressing operations can be very expensive from the energy use standpoint. In addition, the high temperature presses with atmospheric control represent a very high capital cost which increases in proportion to the volume of the sample to be processed.

Another means by which high-technology ceramics are fabricated is by Hot Isostatic Pressing (HIP). The major difference between HIP and hot pressing is that in HIP, isostatic pressure is exerted on the ceramic body during the high temperature cycle rather than uniaxial pressure. The sample to be fabricated is enclosed in a metal envelope, usually of tantalum or stainless steel, cold pressed to the desired shape, and then heated to temperatures up to 2000° C. under the pressure of a working fluid, usually an inert gas, at a pressure in excess of 120 MPa. The advantage of HIP over hot pressing is that complicated shapes can be produced. In HIP, as in hot pressing, sintering is the mechanism by which sample consolidation takes place. However, the equipment and green compact preparation are even more complicated thus raising the product cost higher.

High-technology ceramic materials can also be produced by a process called Self-Propagating High-Temperature Synthesis (SHS). This process involves solid combustion reactions between constituent powders, which are characterized by very high heats of reaction, i.e, reaction temperatures of about 3000° C., and reaction front velocities of a few cm/sec. It is possible to ignite the powder mixtures with a very small amount of energy at which point the heat of reaction that is released sustains further reaction until the whole sample has been synthesized. Fabrication by SHS has a number of distinct advantages over the conventional processes previously discussed. The fact that it is a high temperature process produces a self-purging effect, whereby most contaminants are driven from the sample during the reaction. Since all heat except for the small amount needed for ignition is supplied by the exothermic reaction, the process is highly energy efficient. In addition, the process is potentially more economical than the conventional processes since no high temperature furnace is needed. Because the product is formed at a temperature usually exceeding 2000° C., phases and compositions that cannot be formed at the lower temperatures of conventional processing may be feasible.

The SHS process has been successfully used in a number of applications, both in the US and abroad. Possibly the greatest successes have been achieved in the Soviet Union where the manufacturing of ceramic powders such at $TiC$, $TiB_2$, $SiC$ and $B_4N$, among others, is now done commercially. In addition, the Soviets are using SHS to produce tool bits, dielectric materials, heater elements and high temperature filters. Ir Japan, as well as the US, the production of materials by the SHS process has not progressed to the commercial stage as of yet, but significant applications are being pursued. In the US, applications have been limited to the use of SHS as a source of heat in thermal batteries and aerosol dispersal and as a source of the IR signal in TOW missiles. The thermite reactions that are widely used for field welding of steel are probably the most common application of he SHS reaction principle.

However, there have been serious technical problems associated with the fabrication of high density products by this method. The first is the fact that when mixed powders are reacted by SHS, the product generally exhibits as much as 50% porosity, whereas as little as 0.5% porosity in ceramic materials can be detrimental to performance. The second problem is the cracking of the sample during processing. Gases formed from impurities on the powders which when driven off at the high temperatures, form channels in the sample which become crack initiation sites. Cracking is also caused by the thermal shock to the sample as it cools down from over 2000° C. to ambient in a very short time. If the sample is mechanically loaded in order to increase its density, and its temperature at the time of loading is below the ductile-brittle transition temperature, the internal stresses introduced during such loading may initiate cracking. Another problem is related to the bonding of final product grains to each other. The sample performance depends not only on the absence of porosity but also on the integrity of the inter-granular bonds. The long times at high temperatures needed for sintering action to take place (and its concomitant strong intergranular bonding) is not available for the SHS process since sintering temperatures are sustained for only a few minutes. The final problem is the difficulty in predicting the product properties and synthesis process behavior from the initial powder and compact properties, the initial geometry and ignition parameters.

Several experiments which utilize the SHS principle to achieve high density products of TiC and TiB$_2$ have been attempted in US laboratories. Titanium/Boron and Titanium/Carbon powder mixtures have been heated to ignition inside graphite dies under uniaxial pressure placed inside high temperature furnaces. Densities of about 95% have been achieved for the reacted product. The Ti/B and Ti/C powder mixtures placed inside insulated steel dies have been ignited by tungsten filaments or other small energy sources and reacted. After reaction, the porous product has been compacted by uniaxial pressing in a hydraulic press resulting in densities of about 88%. Ti/C mixtures, encased in insulated tubes have been ignited and continuously compacted in a rolling mill immediately following the passage of the reaction front. Small areas of high density have been achieved by this method.

Explosive consolidation technology has also been used in ceramics processing. An explosively generated shock wave has been used to attempt both ignition and compaction of Ti/B powder mixtures held in strong containment. The results of this experiment have shown complete SHS reaction of the powders but little or no compaction of the product TiB$_2$.

This explosives technology has been applied to powdered metals resulting in successful consolidation of both cylindrical and plate forms. Factors affecting the consolidation are the pressure attained, load duration, and the material being compacted. A cylindrically converging system has been used almost invariably to consolidate high melting point ceramic powders. Starting with Al$_2$O$_3$ powders at room temperature, explosively driven cylindrical compactions have produced material with reasonably pore-free local regions. However, the degree of compaction varies with radius and is sometimes further disrupted by thin spiraled regions of micro-cracked material that occurs because the compaction is spatially nonuniform.

The generally observed result is that large, crack-free specimens of hard, high melting point ceramics cannot be prepared by explosively compacting ceramic powders from the room temperature state. Aluminum nitride is an exception which is readily consolidated because, it is believed, it becomes plastic at high pressure. Partially successful explosive consolidation of ceramic powders has been accomplished by preheating the powders before compaction. Both cylindrical and flat plate samples, crack free and of high density have been made in this way.

DISCLOSURE OF INVENTION

The basic concept of this invention is to make a ceramic body of TiC, TiB$_2$ or any other ceramic which can be reacted by the SHS process, apply no external heat to the system except for what is needed to ignite the SHS reaction, hold the sample in minimal insulation to keep it from cooling too quickly, and while this temperature is above the ductile-brittle transition temperature, compact it to full density with a high pressure wave from an explosive charge. This concept applies to any and all shapes which can be made into green compacts and also have the geometrical symmetry to which a shock wave can be applied. There is no limit to the length and width of plates that can be processed under the concept covered by this invention. The thickness attainable depends on the amount of explosive used.

The first step in the process is preparation of the powders and making a green compact. Although the purity of the powders is not limited, it is advisable to use the highest purity available, since any volatile that is found on the powder will be driven off, rather violently, by the very high temperatures of the reacting sample. This action of the impurity gases leaving the sample may disrupt the sample sufficiently to introduce sizeable cracking which may not fuse under any pressure conditions. The optimum powder size has been found to be about $-325$ mesh. Larger size powders do not react very well in some systems and smaller sizes have such large surface areas that special precautions must be used to prevent absorption of water vapor and other contaminants. Also, smaller sizes may react so quickly that the above described disruption due to even small amounts of volatiles may be a serious problem. The component powders must be thoroughly mixed and pressed into suitable green compacts. There is no limit on the size or shape of the compact other than that it must have symmetry about a plane or axis so as to allow compaction in a direction perpendicular to that plane or axis. Flat discs and rectangular plates are the simplest shapes that meet these pressure symmetry conditions. The only requirement on the pressure at which the green compact is prepared is that it be high enough to keep the compact from falling apart during subsequent assembly.

The green compact is now placed into a container in which both the SHS reaction and explosive compaction can take place. The first requirement on the container is that it be capable of containing the sample during the SHS reaction. While the sample is reacting, the movement of volatile gases out of the reaction zone will tend to break up the sample, sometimes before the reactions has come to completion. Thus, the container must be strong enough at the high reaction temperature (2000° C.) to keep sample pieces from flying away. Mild steel has been found to satisfy this requirement. The container must also be able to allow the escaping, high temperature gases to exit. This condition is met by providing vent holes in the container wall and leaving some space between the sample and the inside walls of the container to allow for relatively free gas movement. Another requirement is that the thermal conductivity and heat capacity of the container be low enough so that the heat generated by the reacting sample is not drained away to the container walls thus quenching the reaction. This requirement is met by making the steel container out of a thin, annular ring and backing this ring with a thermally insulating material such as plaster. The fact that the plaster is used for the bulk of the containment vessel satisfies another requirement, namely that the compressibility of the container by the explosively generated pressure wave be roughly equivalent to that of the ceramic sample. Finally, a high temperature, relatively inert material must be placed between the sample and the steel container to prevent the iron from diffusing into the hot, reacted sample. Grafoil and Zirconia sheet have been found to satisfy this condition.

The top and the bottom of the containment vessel are made of hard steel plates, the bottom being the anvil against which the sample is compressed and the top being the compression plate which provides the compaction pressure. A space is left between the bottom of the compression plate and the top of the green compact. This space is partially filled with the material used to initiate the SHS reaction in the compact. A thin layer of insulating material is placed at the bottom of the compression plate and the top of the anvil plate for additional containment of the heat. A layer of powdered high explosive is placed on top of the compression plate and the whole assembly is then placed into a flattened hole at the top of a pile of sand.

The green compact is remotely ignited and the whole sample is allowed to react. Completeness of the combustion can be verified by either visual observation through a periscope or by thermocouples placed at the bottom of the container vessel. After the synthesis reaction is complete, but before the temperature drops below the ductile-brittle transition temperature of the ceramic, detonation of the explosive is initiated. The explosive is initiated so that detonation wave sweeps across the steel cover plate and the hot ceramic. The effect of the explosion as it propagates over the containment system is to drive the steel compression plate, as a piston, into the hot porous ceramic reaction product and to compress the ceramic to a high density.

As the hot ceramic is compacted by the explosive load, it is further heated by the irreversible work done during compaction. This corresponds to the difference in the pressure-specific volume path during compaction of the porous ceramic from the path in the same space following consolidation as the pressure drops from the compressed state to ambient. This irreversible heating serves to supplement the heating from the SHS reaction and, thereby, to help maintain the thermal conditions necessary for compaction and bonding. To prevent the newly consolidated, and still hot, ceramic sample from undergoing too great a thermal shock, the hot assembly is covered with sand to keep it from cooling too quickly. Initiating the explosive so that detonation wave sweeps over the sample is the condition that allows one to compact samples of unlimited dimensions lateral to the direction of compaction.

In addition to the SHS reaction and explosive compaction, a post compaction thermal treatment is included as a part of the process claimed. The state of the product after compaction is dependent on the temperature attained, the timing of the compaction after the synthesis reaction, the type of explosive used, and the rate of cooling. For some conditions, it may be advantageous to heat the sample after compaction to further enhance bonding. For example, it has been demonstrated that for one set of synthesis and compaction conditions, the compacted sample was easily broken by hand. This sample was subsequently heated to 2400° C., held at temperature for one hour, and furnace-cooled. The Knoop hardness, HK(100 g), of the sample after this treatment was 3180.

BRIEF DESCRIPTION OF DRAWINGS

FIG. 1 is a schematic diagram of the assembly showing the sample, container and explosive charge.

FIG. 2 and FIG. 3 are an illustration of a typical porous charge being compressed by a sweeping explosive charge.

FIG. 4 is an illustration of the density contours (in 1% of theoretical density) in the sample at 15.88 midoseconds after line wave initiation.

BEST MODE FOR CARRYING OUT INVENTION

Referring to FIG. 1 of the drawings, green compact 11, 5.2 cm diameter and 2.5 cm thick, of mixed titanium and carbon powders is pressed in a uniaxial die to a pressure of 137 MPa. The compact composition is a 55/45 molar mixture of −325 mesh Titanium and submicron Carbon black powders. This compact is placed in a 3.8 cm high by 20 cm by 20 cm plaster block 13 whose center has been cored to a diameter of 6.1 cm. Mild steel ring 15 of 1 mm wall thickness and 3.8 cm high is placed between the compact 11 and the plaster 13, in contact with the plaster 13. Both the steel ring and the plaster block have matching vent holes 17 to the outside of the block. A 0.25 mm thick sheet of Grafoil 19 is placed between steel ring 15 and the compact, leaving approximately a 3.2 mm space 21 between the Grafoil and the compact. 1 cm thick, high hardness steel plates 23 and 25 are attached both to the top and bottom of the block of plaster 13. A 1 mm thick sheet of Zirconia 27 insulation is inserted in between the bottom steel plate 25 and the compact 11. On top of the green compact is laid 5 grams of a mixture of loose titanium (−400 mesh, 3.5 g) and boron (5 micron, 1.5 g) powders 31 with an electric match 33 at the center, the electrical leads 35 from the match being taken out through one of the holes. Another layer of Zirconia 37 insulation is placed between the top of the igniter powder 31 and the top steel plate 23. Steel plates 23 and 25 are held in place by plexiglass plates both top and bottom and connected by thin, brass threaded rod. A plexiglas box to contain the explosive powder 38 is attached to the top plexiglass plate. FIG. 1 shows a diagram of this assembly.

This assembly, loaded with a 5 cm layer of amatol explosive powder 38 (about 0.5 KG) is placed on the leveled top of a sand pile. Electric match 33 is ignited remotely by a 45 Volt battery. Burning electric match 33 ignites the loose Ti+B powder 31, which in turn ignites the Ti+C green compact 11. The gases that are released during the combustion of the sample escape through vent holes 17 in steel ring 15 and backing plaster container 13. The heat from the Ti +C SHS reaction is high enough to not only propagate the reaction through the whole sample, but also to heat the sample to temperatures in excess of 2000° C. Although the reaction proceeds to completion in 5 to 10 seconds, the sample temperature stays above the ductile-brittle transition temperature for TiC (1400° C.) for several minutes. At about the 10 second mark, or when the temperature of the reacted sample has equilibrated prior to beginning to decrease, explosive 38 is initiated so that a detonation wave sweeps over the sample. This explosion sets compression plate 23 in motion and it, in turn, applies a high pressure on the hot, reacted TiC sample 11, compacting it to high density.

A TiC sample fabricated by the above described procedure was found to have the following properties: Final diameter, 5.5 cm; Final thickness, 1.2 cm; Core density, 88.7% of theoretical; Hardness, HK (400 g) −1465+/−300; X-ray diffraction results show only TiC, no free Ti or C.

A second sample, of TiB$_2$ fabricated in a similar fashion as above but with the precursor powders being −325 mesh titanium and 0.5 micron amorphous boron in a 33/67 atomic ratio, was found to have the following properties: Final diameter, 5.5 cm; Final thickness, 1.2 cm; Core density, 93.8% of theoretical; Hardness, HK (400 g) −2079+/−250; X-ray diffraction results show only TiB$_2$ no free Ti or B.

We claim:

1. A method for the fabrication of a high density, monolithic ceramic material comprising the steps of:
   subjecting a mixed powder to a uniaxial pressure to form a green compact, subjecting the compact to a solid combustion reaction employing self-propagating high temperature synthesis to form hot, porous ceramic, subjecting the hot ceramic while at a temperature above its ductile brittle transition temperature to an explosively generated shockwave to generate high pressures to compress the ceramic, and slowly cooling the material.

2. A method in accordance with claim 1, wherein the compressed ceramic is heated to a temperature of about 2400° C. for a period of one hour and cooled.

3. A method in accordance with claim 1, wherein the mixed powder is selected from the group consisting of Titanium-Carbon, and Titanium-Boron.

* * * * *